April 30, 1940.  G. EICHELBERG  2,199,307

AIR VALVE FOR COMPRESSORS AND THE LIKE

Filed Jan. 21, 1939   2 Sheets-Sheet 1

Inventor
Gustav Eichelberg
By B. Singer, Atty.

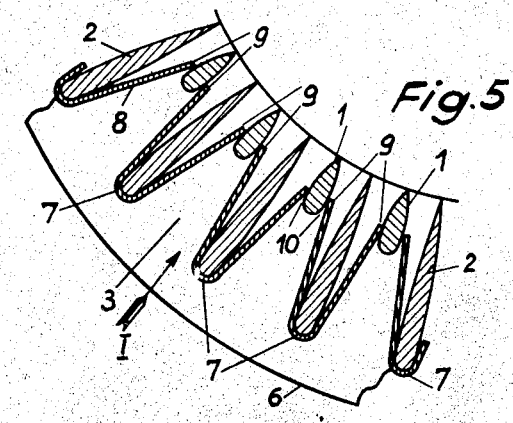

Patented Apr. 30, 1940

2,199,307

UNITED STATES PATENT OFFICE 2,199,307

AIR VALVE FOR COMPRESSORS AND THE LIKE

Gustav Eichelberg, Zurich, Switzerland

Application January 21, 1939, Serial No. 252,181
In Germany February 27, 1937

5 Claims. (Cl. 277—60)

Automatic, that is to say non-positively actuated air valves are used for example in air compressors as suction and pressure valves and as scavenging valves in subsequent charging ports of two-stroke Diesel engines and so forth.

They however all have the disadvantage that the air stream is subjected to a multiple change of direction in such a manner that a substantial drop in pressure occurs.

The object of the invention is to eliminate these and other disadvantages and according to the invention this result is obtained in that, as closure elements, there are used resilient laminae which mainly extend in the direction of flow of the air and are only slightly inclined to the direction of flow. The clamping edge, about which the lamina rocks when opening and closing the air path and the closing or packing points located at the free end piece of the lamina are located behind one another in the direction of flow of the air stream. The dimensions of the laminae are comparatively large so that on the rocking of the laminae through only a small angle the exposed through-flow opening is comparatively very large. The work to be performed by the through flowing air for moving the laminae is small and in addition the deviation of the air stream when flowing over the closing point is very small.

The bodies for holding and packing the laminae are so shaped that the surfaces located in the air path assist in guiding the air-stream free from loss. When opening the laminae there is exposed a straight passage for the flow which beyond the narrowest cross-sectional area is enlarged in the manner of a diffuser for the purpose of converting the velocity energy into pressure energy.

Each resilient lamina can only be held open by the excess of pressure in front of the lamina over the pressure behind the same. In the case of valves without a diffuser action at least, this pressure difference for the through-flow is lost by the valve. In the case of diffuser valves there occurs in the narrowest cross-sectional area a lower pressure than between the inlet and outlet. This lower pressure is adapted, according to the present invention, to be utilised as negative pressure on the rear side of the valve laminae, so that therefore the outlet edge of the laminae must not extend up to the end of the diffuser but only up to the narrowest cross-sectional area, so that the last pressure prevailing there can be distributed effectively behind the laminae. For the same reasons a lateral flow around the laminae must be avoided as the action desired to be obtained would be reduced if the negative pressure at the rear side of the laminae were again lost.

A certain opening of the new valve, at small pressure differences is to be obtained in that suitably thin and long laminae are used, which however in the closed condition must be supported against the pressure load by bars extending substantially in the direction of flow.

The difficulty of clamping and simultaneously packing these laminae is eliminated according to the present invention in that each two adjacent laminae are formed from a single strip of sheet metal by bending, with a small radius of curvature to approximately U-shape and by pressing a bar with a circular profiled laminae-bearing surface into the U laminae, an effective packing is obtained towards the outside along the curved portion.

These profiled bars can be simultaneously constructed as diffuser profiles and shaped according to the prevailing requirements.

The form of construction described has the substantial advantage of the effective utilisation of the space for the effective valve cross-sectional area and a low loss coefficient by the avoidance of change of direction in the air-stream and by diffuser action.

In the accompanying drawings there is shown diagrammatically an example of construction of the subject of the invention, wherein:

Fig. 1 is a diagrammatic sectional perspective view later again referred to.

Fig. 5 is a cross section illustrating a modification.

Figure 1:
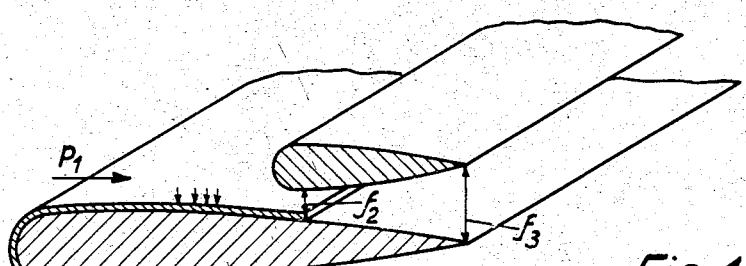

The valve shown is provided with a valve body which has a row of parallel bars 1 which are rigidly connected together by transverse ribs 3. Between each two succeeding bars is located a holder 2 which is pressed by set screws 4 against the end bars 11 of the valve body. Each holder 2 serves to hold a piece of sheet metal 7, of resilient material, for example, steel, bent into U-shape. The two limbs 8 form resilient laminae. The free edges 9 of the laminae 8 bear resiliently against the side surfaces of the bars 1 and serve to close the air path.

Between the bars 1 and the holding bodies 2 the laminae vibrate about their clamping points at 7. The clamping points 7 and the packing point 10 of the laminae against the bars 1 are located behind one another in the direction of flow (see arrow I) of the air. The bending point 7 of the piece of sheet metal has a comparatively small radius of curvature.

Where the air stream meets the bars 1 they have a comparatively small radius of curvature. The laminae 8 together with the lateral wall of the bar form a nozzle shaped passage. As soon as the laminae 8 are opened the passage acts as a diffuser. The free edge 9 of the lamina bears against about the narrowest point of this passage. The side edges of each lamina extend, with as effective a packing action as possible, against the end wall of the carrier 6. In this manner the air is prevented practically completely from flowing around these edges. Both the bars 1 and the holding body 2 terminate at the top in sharp edges. The lateral walls of these parts and also the laminae serve for effectively guiding the air. The air flows through the valve without any substantial deviation from its direction of flow and without any appreciable loss in pressure.

As shown in Fig. 5 the carrier 6 may be constructed as a ring. The valve arrangement is particularly suitable for compressors having a high speed.

Figure 1A:
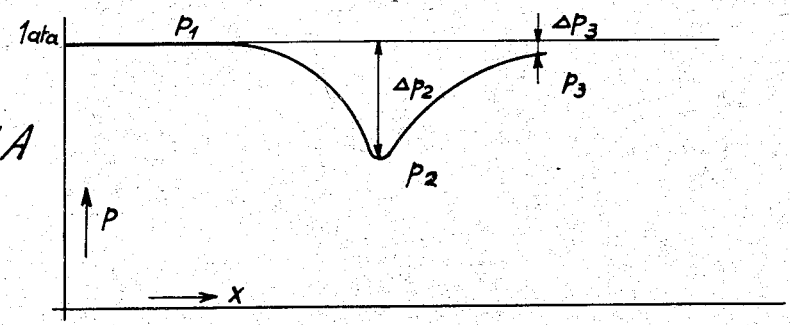
Fig. 1A shows a diagram of the pressure variation when air flows through the valve.
Figure 3:
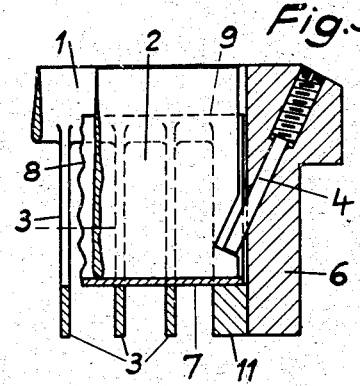
Fig. 3 is a section of this valve.
Figure 2:
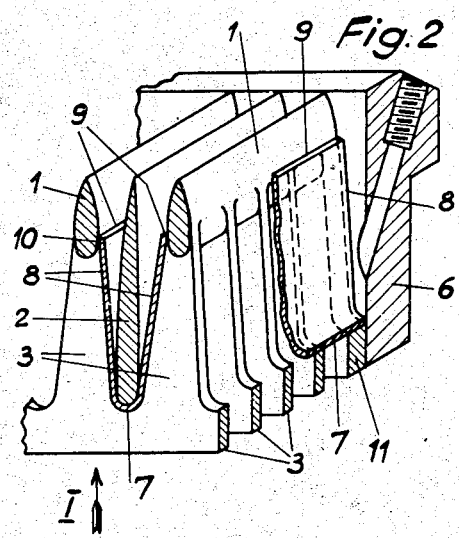
Fig. 2 is a perspective view of a portion of a valve.
Figure 4:
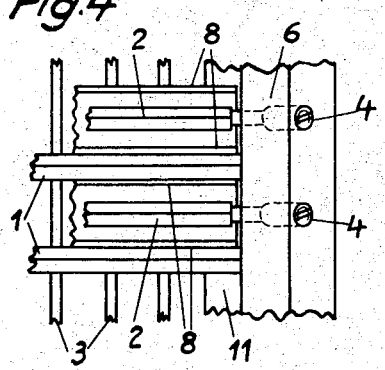
Fig 4 is a plan.

The pressure conditions are shown in Fig. 1. The diagram in Fig. 1 shows the pressure variations of the air stream flowing through the valve. The air flows into the valve at a pressure $p_1$. This pressure decreases at the narrowest throughflow at $f_2$ to $p_2 = p_1 - \Delta p_2$. The pressure $p_2 = p_1 - \Delta p_2$ again increases at $f_3$ to $p_3$. The abbreviation "ata" in the drawings (see Fig. 1A) means atmospheres absolute, or absolute atmospheric pressure.

What I wish to claim and secure by U. S. Letters Patent is:

1. A valve for compressors for a compressible medium comprising laminae extending in the direction of flow of the medium and consisting of a resilient material, holders of pear-shaped cross section for the said laminae, bars of pear-shaped cross section extending parallel to the said holders and cooperating with the laminae, each two laminae consisting of a single piece of sheet metal of U-shaped cross section which embraces the said holder and of which each of the two ends bears resiliently and with a packing action against a separate bar, the ends of the said holders and the said bars located on the outflow side of the valve being located at the same distance from the inlet of the structure.

2. A valve for compressors for a compressible medium comprising laminae extending in the direction of flow of the medium and consisting of a resilient material, holders of pear-shaped cross section for the said laminae, bars of pear-shaped cross-section extending parallel to the said holders and cooperating with the laminae, each two laminae consisting of a single piece of sheet metal of U-shaped cross section which embraces the said holder and of which each of the two ends bears resiliently and with a packing action against a separate bar, the ends of the said holders and the said bars located on the outflow side of the valve being located at the same distance from the inlet of the structure, a valve body bearing the holders and clamping screws to press the holders and the sheet metal of U-shaped cross section to said valve body.

3. A valve for compressors for a compressible medium comprising laminae extending in the direction of flow of the medium and consisting of a resilient material, holders of pear-shaped cross section for the said laminae, bars of pear-shaped cross-section extending parallel to the said holders and cooperating with the laminae, each two laminae consisting of a single piece of sheet metal of U-shaped cross section which embraces the said holder and of which each of the two ends bears resiliently and with a packing action against a separate bar, the ends of the said holders and the said bars located on the outflow side of the valve being located at the same distance from the inlet of the structure, a valve body bearing the holders and clamping screws to press the holders and the sheet metal of U-shaped cross section to said valve body, the said clamping screws being screwed through the side walls of the valve body.

4. In a flap valve structure, a set of parallelly disposed bars tapered in cross section to provide straightway fluid passages between them, the narrowest portions of said passages being adjacent the widest portions of said bars, means rigidly holding said bars in spaced relation, resilient laminae anchored at their inner ends and having their outer ends constructed to lie substantially at the narrowest portions of said passages, said laminae being designed to conform to the bars, there being one lamina used per passage.

5. A flap valve structure including a pair of parallelly disposed bars of an outwardly tapered cross section to provide a nozzle-shaped passage, means to hold said bars rigidly in spaced relation and to provide fluid passages for communication with the nozzle-shaped passage, resilient laminae, means to hold said laminae rigidly along their inner ends and having their outer free ends arranged to lie at approximately the narrowest portion of said nozzle-shaped passage, said laminae being constructed to close said nozzle-shaped passage when back pressure occurs therein and to open said nozzle-shaped passage when the positive pressure acting on the seating faces of said laminae is sufficient to overcome the resiliency of said laminae, there being one lamina used per fluid passage.

GUSTAV EICHELBERG.